Figure 1:
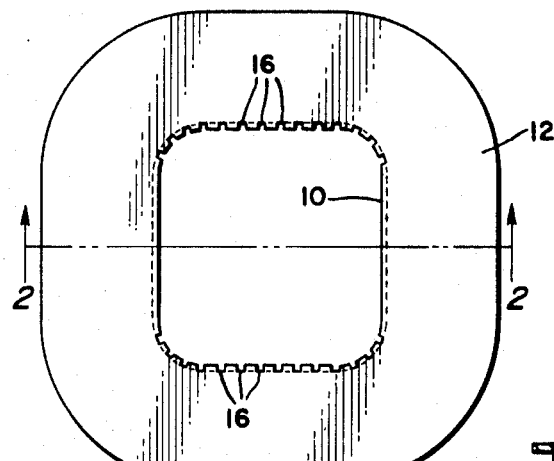

April 14, 1964          M. E. SIMMONS          3,129,348
COIL SPOOL CONSTRUCTION
Filed May 19, 1961

INVENTOR.
Milton E. Simmons
BY
His Attorney

United States Patent Office 3,129,348
Patented Apr. 14, 1964

3,129,348
COIL SPOOL CONSTRUCTION
Milton E. Simmons, Rochester, N.Y., assignor to General Motors Corporation, Detroit, Mich., a corporation of Delaware
Filed May 19, 1961, Ser. No. 111,264
7 Claims. (Cl. 310—194)

This invention pertains to the construction of electric coils, and particularly to an improved bobbin and coil assembly embodying the same.

Heretofore, the majority of direct current motors of the automotive type have embodied a stator core comprising a plurality of stacked laminations suitably secured together, each lamination having a pair of diametrically opposed pole formations of arcuate configuration. The field coils for motors of this type are prewound and taped, assembled over the pole formations and thereafter deformed to an arcuate configuration so as to conform to the interior configuration of the stator core. In an effort to reduce the cost of automotive type direct current motors, formed pole pieces of arcuate configuration such as shown in the Carlson Patent 2,913,603 have been proposed for use in round motors thereby enabling a substantial savings in material over the laminated stator construction. However, this type of pole piece construction does not lend itself readily to the use of prewound taped coils of the type used with the laminated stator construction since the coils for the solid or formed pole pieces are wound on a bobbin and assembled with the pole piece prior to assembly of the pole piece and field coil to the motor frame. The present invention pertains to a coil assembly designed particularly for use with round motors having formed pole pieces, and a method of making the same.

Accordingly, among my objects are the provision of an improved coil assembly which is flexible in one plane and inflexible in a plane normal thereto; the further provision of a coil assembly including an initially flat bobbin having a coil wound therearound which is thereafter formed to an arcuate shape and retained in this shape by permanent deformation of the wires of the core; the still further provision of an improved bobbin which is flexible in one plane and inflexible in a plane normal thereto; and the still further provision of a method of making.

The aforementioned and other objects are accomplished in the present invention by utilizing a bobbin composed of resilient plastic material having a pair of oppositely disposed slotted core walls which render the bobbin core flexible in one plane while maintaining it inflexible in a plane normal thereto. Specifically, the bobbin is composed of nylon and includes a substantially rectangular core having integral flanges at opposite ends thereof. The side walls of the core are formed with a plurality of axially extending slots, the slots extending throughout the entire length of the two side walls. Accordingly, the bobbin core is quite flexible in a plane parallel to the slotted side walls while being rigid, or inflexible, in a plane normal to the slotted side walls. The bobbin is initially formed flat, that is the flanges are normal to the core and located in spaced parallel planes. A coil is wound around the core with the bobbin in this position, and thereafter the coil construction is formed to an arcuate shape, this being permitted by the flexible walls of the core. After the coil construction has been deformed, the wires of the core will retain the core in an arcuate shape since they are permanently deformed.

The arcuate coil assembly can thereafter be readily assembled with the body of a formed pole piece, after which the pole piece can be assembled with a cylindrical motor frame in any well known manner. It will be apparent that by winding the coil with the bobbin in the flat condition substantial economies can be realized, while the end product can be deformed to the desired arcuate shape in a straight forward manner so as to conform to the cylindrical contour of the motor frame.

Further objects and advantages of the present invention will be apparent from the following description, reference being had to the accompanying drawing, wherein a preferred embodiment of the present invention is clearly shown.

Figure 3:
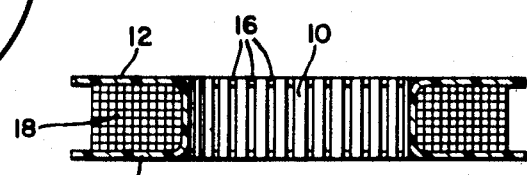
Figure 2:
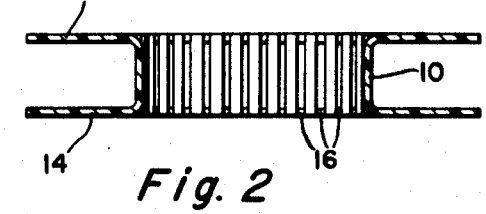
Figure 5:
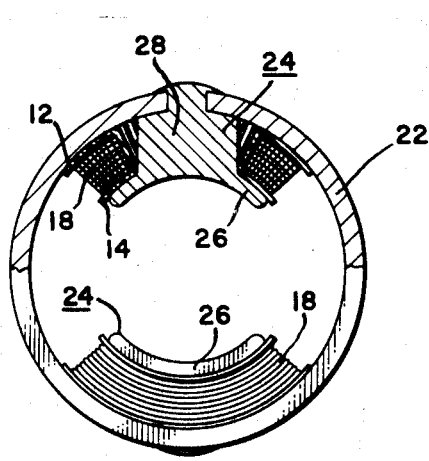
Figure 4:
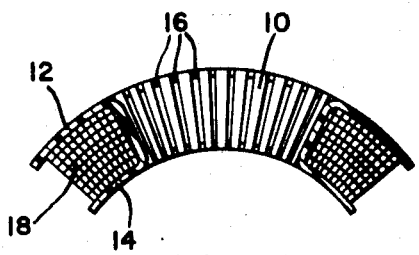

In the drawing:
FIGURE 1 is a plan view of the improved bobbin construction.
FIGURE 2 is a sectional view taken along line 2—2 of FIGURE 1.
FIGURE 3 is a sectional view similar to FIGURE 2 with the coil winding in place.
FIGURE 4 is a sectional view of the coil after it is formed to an arcuate shape.
FIGURE 5 is a sectional view of a motor stator embodying the coil construction of this invention.

With reference to FIGURES 1 and 2, the improved bobbin may be composed of any suitable resilient plastic insulating material, such as nylon, and is initially molded in the flat condition and comprises a core 10 of substantially rectangular configuration with integral end flanges 12 and 14. The end relatively thin flexible flanges 12 and 14 are located in spaced parallel planes, and are substantially normal to the side walls of the core 10. In order to impart flexibility to the bobbin core in one plane, opposite side walls of the core 10 are axially slotted from end to end as indicated by numeral 16. The slots 16 are preferably equidistantly spaced and of uniform size. The slots 16 are shown of rectangular configuration but, if desired, the slots 16 may have tapered side walls without departing from the scope of the present invention. By forming slots 16 in opposed side walls of the core 10, the bobbin core is quite flexible in a plane parallel to the slotted side walls, that is, the bobbin can be flexed in an arcuate shape, while remaining substantially inflexible in a plane parallel to the solid side walls, or, in other words, in a plane normal to the plane of the slotted side walls.

With the bobbin in the flat condition shown in FIGURE 2, a wire coil 18 is wound about the core 10. Thereafter the coil and bobbin, constituting the coil assembly, is formed by suitable dies to an arcuate shape as shown in FIGURE 4. During the forming operation the bobbin core is flexed in a plane parallel to the slotted side walls of the core and the wires of the coil 18 are permanently deformed so that when the coil assembly is removed from the dies it will retain the arcuate configuration shown in FIGURE 4. The flexible end flanges of the bobbin are likewise deformed by the coil. Of course, during the forming operation the core slots 16 are opened wider adjacent the larger radius and are proportionately closed adjacent the smaller radius.

When the coil assembly has been formed to an arcuate configuration, it is ready for assembly with a similarly formed pole piece. Thus, as shown in FIGURE 5, the motor stator may comprise a cylindrical frame 22 having a pair of formed pole pieces 24 suitably connected thereto and having arcuate pole shoes 26. Each pole piece 24 includes a substantially rectangular pole body 28 over which the arcuate coil assembly 20 is assembled prior to assembly of the pole piece with the cylindrical frame 22. It will be noted that the flanges of the bobbin 12 and 14 substantially conform to the configuration of both the pole tips 26 and the inner circumference of the cylindrical frame 22.

While the embodiment of the invention as herein disclosed constitutes a preferred form, it is to be understood that other forms might be adopted.

What is claimed is as follows:

1. A bobbin for supporting an electric coil comprising, a core of insulating material having a pair of end flanges, said core having oppositely disposed axially slotted side walls so that said core is flexible in a plane parallel to said side walls and substantially inflexible in a plane normal thereto.

2. A bobbin for supporting an electric coil comprising, a core of resilient plastic material having integral end flanges located in spaced parallel planes normal to said core, opposite side walls of said core being axially slotted throughout their lengths so that said core is flexible in one plane while being substantially rigid in a plane normal thereto.

3. A bobbin for supporting an electric coil comprising, a core of plastic insulating material having integral end flanges, said core defining an opening of substantially rectangular configuration and having oppositely disposed axially slotted side walls whereby said core is flexible in a plane parallel to said slotted side walls and relatively inflexible in a plane normal to said slotted side walls.

4. A bobbin for supporting an electric coil comprising, a core of substantially polygonal configuration composed of resilient plastic insulating material and having integral end flanges located in spaced parallel planes normal to said core, opposite side walls of said core being axially slotted throughout their lengths whereby said bobbin is flexible in a plane parallel to said slotted side walls.

5. A coil assembly comprising, a bobbin composed of plastic insulating material having a core and a pair of end flanges, the opposite side walls of said core being axially slotted throughout their lengths whereby said bobbin is flexible in a plane parallel to said slotted side walls, and a wire coil encircling said core and disposed between said end flanges, said coil assembly being deformed to an arcuate shape in the plane of flexibility of said bobbin after the coil is wound therearound with the wires of the coil being permanently deformed to retain the coil assembly in its arcuate shape.

6. A coil assembly comprising, a bobbin of resilient plastic insulating material having a substantially rectangular core with an integral flange at each end, opposite side walls of said core being axially slotted, and a coil encircling said core and disposed between said end flanges, said coil being permanently deformed to an arcuate configuration so as to flex said bobbin and retain it in said arcuate configuration.

7. A bobbin for supporting an electric coil comprising, a core of plastic insulating material having integral end flanges, said core defining an opening of substantially rectangular configuration having a pair of oppositely disposed solid side walls and a pair of oppositely disposed axially slotted side walls, whereby said core is flexible in a plane parallel to said slotted side walls and substantially rigid in a plane normal to said slotted side walls.

References Cited in the file of this patent
UNITED STATES PATENTS

| | | |
|---|---|---|
| 1,969,281 | Stein | Aug. 7, 1934 |
| 2,328,335 | Fryer | Aug. 31, 1943 |
| 2,447,366 | Ruscito | Aug. 17, 1948 |
| 2,659,543 | Guyer | Nov. 17, 1953 |
| 3,002,610 | Gronger | Oct. 3, 1961 |